US010109073B2

(12) United States Patent
Sharma et al.

(10) Patent No.: US 10,109,073 B2
(45) Date of Patent: Oct. 23, 2018

(54) FEATURE TRACKING AND DYNAMIC FEATURE ADDITION IN AN AUGMENTED REALITY ENVIRONMENT

(71) Applicant: Verizon Patent and Licensing Inc., Arlington, VA (US)

(72) Inventors: Manish Sharma, San Jose, CA (US); Anand Prakash, San Jose, CA (US); Devin Blong, Penngrove, CA (US); Qing Zhang, Cupertino, CA (US); Chetan Mugur Nagaraj, Fremont, CA (US); Srivatsan Rangarajan, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 76 days.

(21) Appl. No.: 15/271,425

(22) Filed: Sep. 21, 2016

(65) Prior Publication Data

US 2018/0082430 A1  Mar. 22, 2018

(51) Int. Cl.
*G06T 7/73* (2017.01)
*G06K 9/00* (2006.01)

(52) U.S. Cl.
CPC .......... *G06T 7/73* (2017.01); *G06K 9/00208* (2013.01); *G06K 9/00758* (2013.01); *G06T 2207/30244* (2013.01)

(58) Field of Classification Search
None
See application file for complete search history.

(56) References Cited

U.S. PATENT DOCUMENTS

| 2013/0083011 | A1* | 4/2013 | Geisner | G09G 5/00 345/419 |
| 2014/0267419 | A1* | 9/2014 | Ballard | G06T 11/00 345/633 |
| 2017/0123750 | A1* | 5/2017 | Todasco | G06F 3/1454 |

* cited by examiner

*Primary Examiner* — Justin P. Misleh

(57) ABSTRACT

A mobile device stores a target image and target image data collected contemporaneously with the target image. The mobile device receives a reference position indication that corresponds to the target image data and receives a video feed from a camera while the mobile device is in the reference position. The mobile device detects a match between a first image from the video feed and the target image, unlocks an augmented reality space, and instructs presentation of a virtual object within the augmented reality space. The mobile device receives sensor data and a continuing video feed from the camera, compares a second image from the continuing video feed with the first image, and identify common features in the first and second images. The mobile device detects a location change based on the sensor data and changes in the common features between the first and second images.

20 Claims, 14 Drawing Sheets

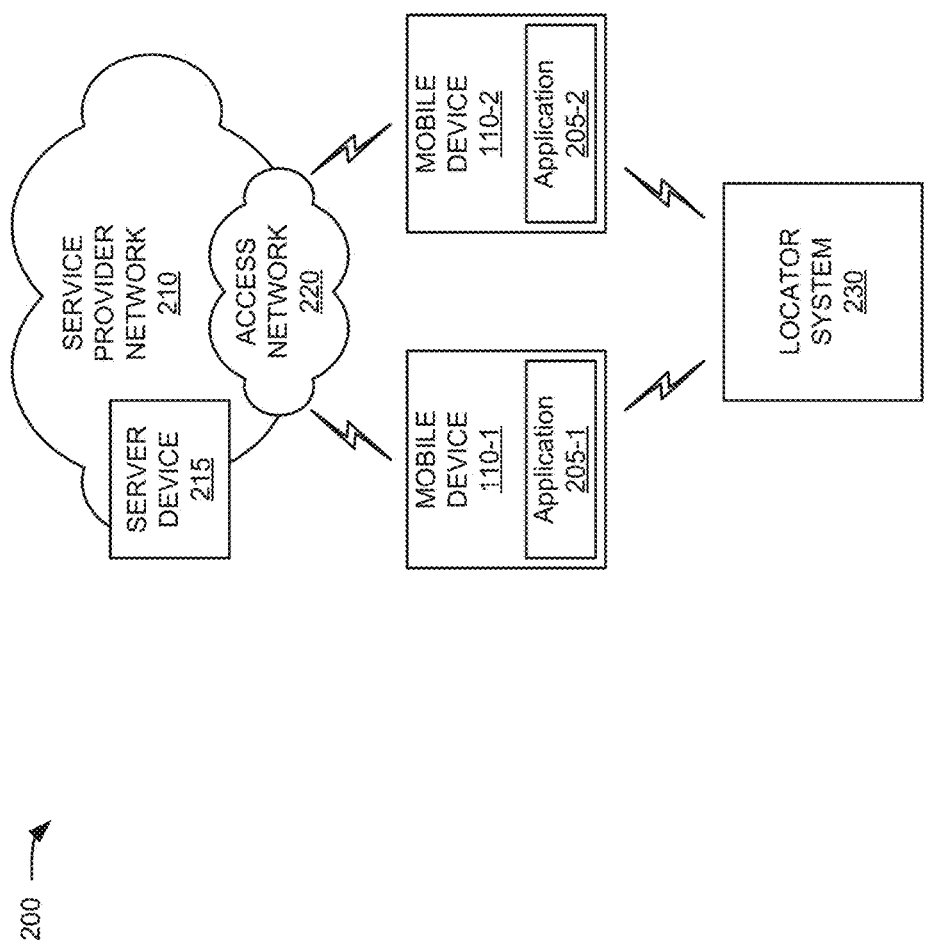

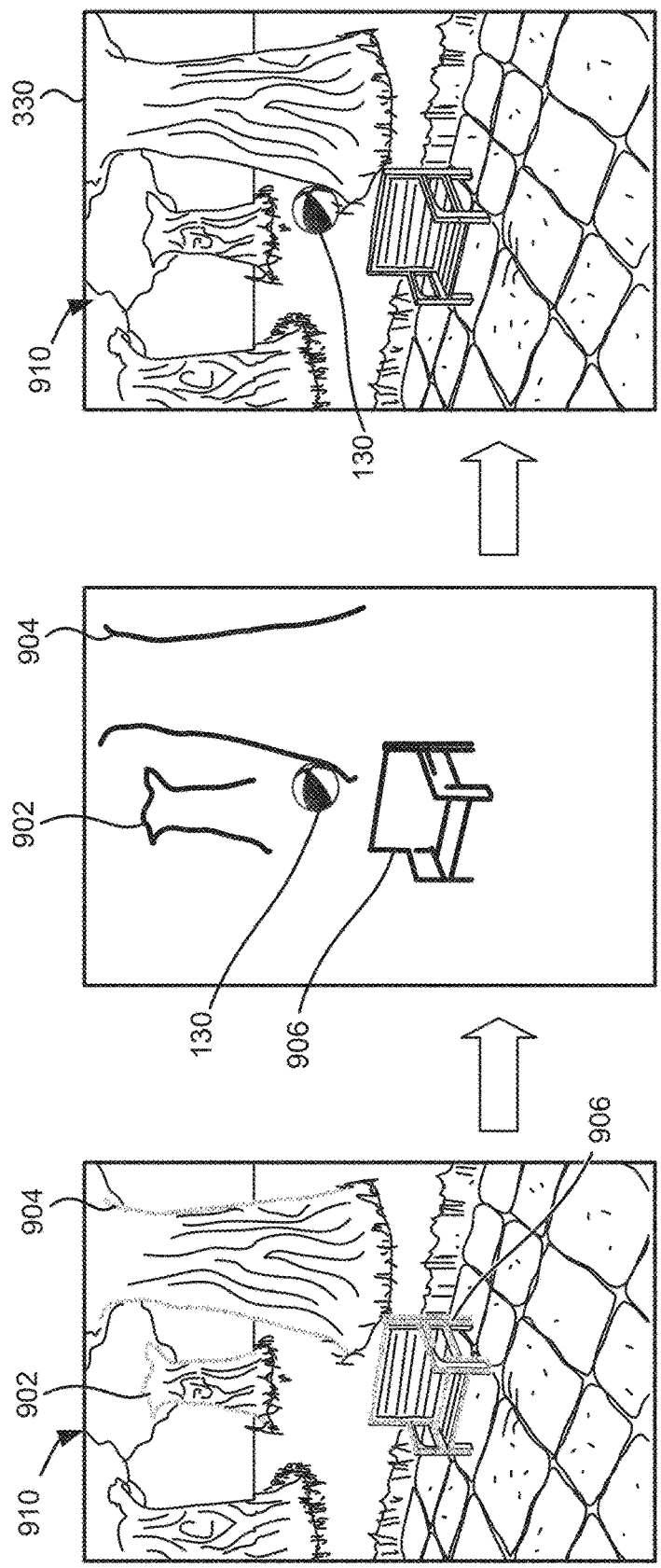

FEATURE TRACKING AND DYNAMIC FEATURE ADDITION IN AN AUGMENTED REALITY ENVIRONMENT

BACKGROUND

Augmented reality refers to the live direct or indirect view of a physical, real-world environment. Augmented reality technology can enhance a user's current perception of reality by supplementing elements of the real-world environment with computer-generated elements such as graphics, video, sound, geographic location data, etc. One challenge when inserting visual computer-generated elements into real-world images is to consistently present the virtual object with perspective that compensates for the movement of the user in a manner that appears authentic.

BRIEF DESCRIPTION OF THE DRAWINGS

FIG. 2 is a diagram that depicts an exemplary network environment in which systems and methods described herein may be implemented;

FIGS. 9A-9C are diagrams illustrating tracking features and adding features to a feature set according to an implementation described herein;

DETAILED DESCRIPTION OF THE PREFERRED EMBODIMENTS

The following detailed description refers to the accompanying drawings. The same reference numbers in different drawings may identify the same or similar elements.

Systems and methods described herein perform feature tracking and dynamic feature addition when processing real-world images, such as images from a video feed. More particularly, the systems and methods described herein use information from technologies (e.g., a single rear-facing camera, a gyroscope, a magnetometer/compass, an accelerometer, and a location-detection system), which may be included in a mobile device, to identify features in images and monitor relative movements of the mobile device (such as a smart phone). In one implementation, detection of the relative movements may be used as a basis for rendering virtual objects in an augmented reality environment, such that visual computer-generated elements can be accurately overlaid onto real-world images.

Previous attempts to apply virtual objects with depth perspective have required multiple cameras and other sensors to accurately identify an environment and render the virtual objects with the appearance of occupying three-dimensional space. For example, a typical augmented reality system may require information from a deep focus camera, a shallow focus camera, and an infrared sensor. However, most mobile consumer devices are not equipped with such technology, and the addition of this technology can drive up the price of the mobile consumer devices.

Figure 1:
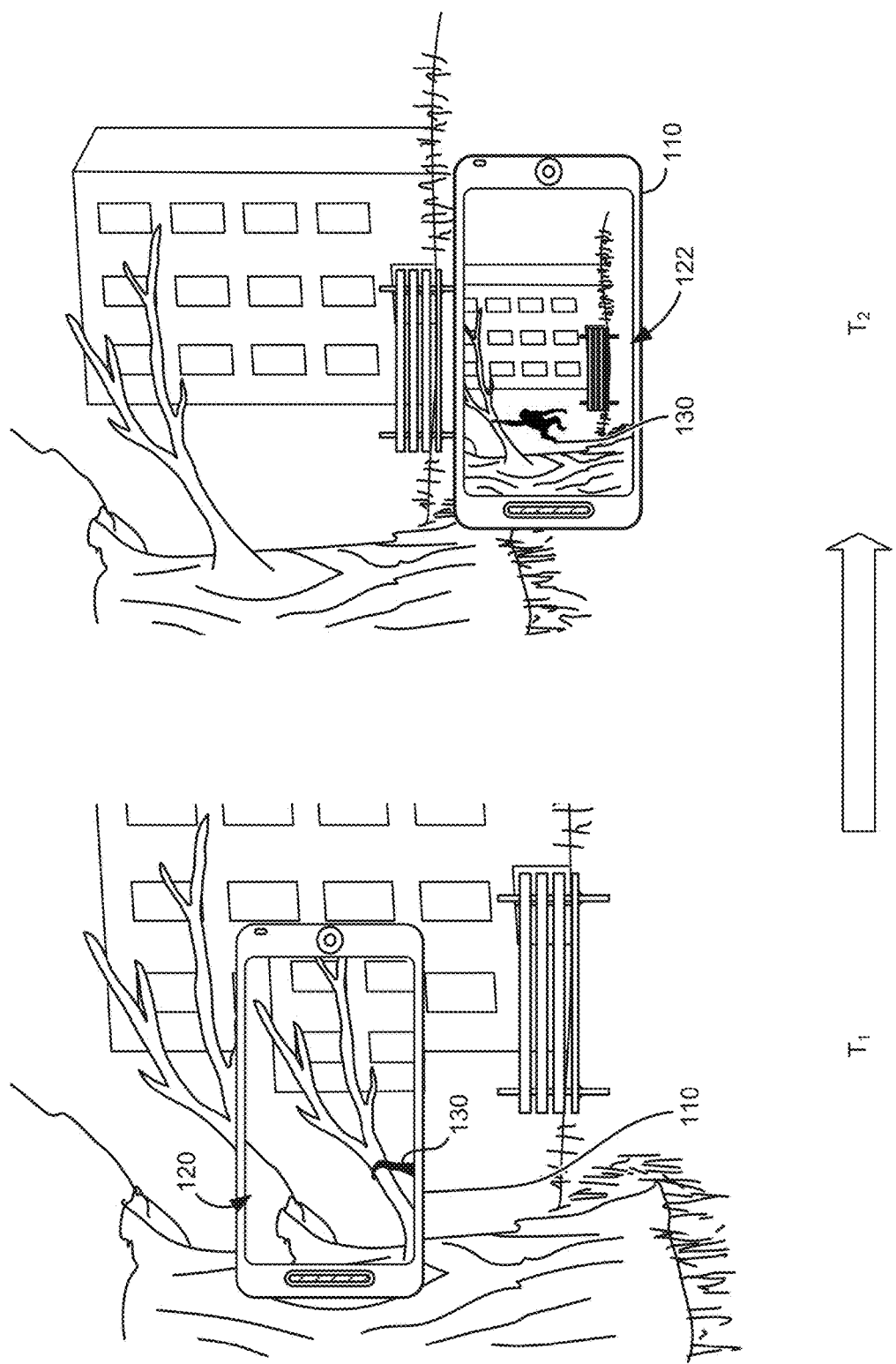
FIG. 1 is a diagram illustrating an implementation described herein.

FIG. 1 is a diagram illustrating an implementation described herein. A mobile device 110 (e.g., smart phone, a tablet computer, etc.) may be equipped with an augmented reality (AR) application. As shown in FIG. 1, an image 120 may be captured by mobile device 110 (e.g., using a frame from a video camera feed) and an initial reference position of mobile device 110 may be determined from sensor and location data obtained contemporaneously with capturing target image 120. The AR application may store image 120 and record a geographic location (or "geo-location"), direction heading, tilt, etc., of mobile device 110 at the time of capturing image 120. Image 120 may be referred to as a "target image," and the geographic location, direction heading, tilt, etc. of mobile device 110 may generally be referred to as "target image data." Target image 120, along with the target image data, may serve as an initial point of reference for an AR space.

Once the initial reference position is established for mobile device 110, a user may use mobile device 110 to place virtual objects within the AR space. Using feature recognition technology, mobile device 110 or a backend server (not shown in FIG. 1) may identify one or more features in the AR space, such as features in target image 120 or in other real-world images captured when rotating from the reference position. A "feature" may be a unique set of pixels included in image 120. The feature may be an object, a portion of an object, or some other group or set of pixels that are a part of image 120 (e.g., in whole or in part). Features may be tracked between images and can be considered somewhat predictable for changes between sequential images. For example, a tree branch may be a feature identified by the feature recognition technology.

A user may create an augmented reality space that includes a virtual object 130 associated with a particular feature (e.g., a tree branch) prior to time $T_1$. In one aspect, a user of mobile device 110 may use the AR application to insert virtual object 130 into the AR space. The user may define an object type, a size, a virtual location, an orientation, and/or other details of virtual object 130 for placement within the AR space. The object type, size, virtual location, and other features may be referred to as an "object definition." At some time, $T_1$, after placing virtual object 130, mobile device 110 (or a different mobile device) may return to the initial reference position and replicate target image 120 on a frame of a video feed to unlock the AR space.

After unlocking the AR space and at a later time, $T_2$, mobile device 110 may be moved to a different geographic location and capture another image 122 (e.g., with zoom functionality of the camera disabled). For example, a user of mobile device 110 may take several steps backwards and tilt the camera of mobile device 110 slightly lower, allowing mobile device 110 to capture another frame from the video camera feed at time $T_2$. Based on changes to the feature (e.g., the tree branch) between image 120 and image 122, the AR application can detect a point of reference change in mobile device 110. More particularly, the AR application may detect that mobile device 110 has moved down and away from the tree branch. The AR application may detect a change in position of mobile device 110 at time $T_2$, relative to time $T_1$, based on the differences in image data. For example, the AR application may detect the proportional changes of the tree branch in image 120 and the same tree branch in image 122. In one implementation, mobile device 110 may use other sensor data (such as an accelerometer) to detect a direction of movement and assist in determining the change in position of mobile device 110.

As described further herein, the AR application may detect additional features in images to detect additional movements of mobile device 110. For example, image 122 may include new features (e.g., a park bench, windows of a building, etc.) that may be detected and used for subsequent comparison with images captured after time $T_2$ to detect a further change in position of mobile device 110.

According to one implementation, the detected changes in position may be used to accurately render virtual objects with perspective/depth. For example, upon determining the updated position of mobile device 110 at time $T_2$, virtual object 130 may be rendered and overlaid on image 122 with a size and position consistent with the changes in position from the target image data. That is, based on the detected position of mobile device 110 at time $T_2$, virtual object 130 may be rendered and overlaid on image 122 in proportion to the changes in the tracked features (between image 120 and image 122).

FIG. 2 is a diagram illustrating an exemplary network environment 200 in which systems and methods described herein may be implemented. As illustrated, network environment 200 may include mobile devices 110-1 and 110-2 (referred to generically as "mobile device 110" and collectively as "mobile devices 110"), a service provider network 210 including a server device 215, an access network 220, and a locator system 230. Components of network environment 200 may be connected via wired and/or wireless links.

Mobile device 110 may include a portable communication device (e.g., a mobile phone, a smart phone, a tablet device, a global positioning system (GPS) device, and/or another type of wireless device); a laptop (e.g., with a wireless air card) or another type of portable computer; a portable gaming system; and/or any other type of mobile computer device with communication and output capabilities. In one implementation, mobile device 110 may include a camera and one or more sensors to capture additional information regarding a user or a surrounding environment of mobile device 110. For example, mobile device 110 may include a location sensor, such as a sensor to receive a GPS or other location data, or a component to dynamically determine a location of mobile device 110. As another example, mobile device 110 may include an accelerometer, compass, gyroscope, etc.

Mobile device 110 may operate according to one or more wireless communication standards such as broadband cellular standards (e.g., long-term evolution (LTE) network, wideband code division multiple access (WCDMA), etc.), local wireless standards (e.g., Wi-Fi®, Bluetooth®, near-field communications (NFC), etc.), or according to other communications standards.

In one implementation, mobile device 110 may be provided with one or more applications 205-1 and 205-2 (e.g., an AR application, referred to generically as "AR application 205") to generate and present virtual objects in a reality image. AR application 205 is described further in connection with, for example, FIG. 5.

Service provider network 210 may include network devices that provide telecommunications services and provide a backend system for supporting functions of mobile devices 110. Service provider network 210 may include a local area network (LAN), an intranet, a private wide area network (WAN), a telephone network, such as the Public Switched Telephone Network (PSTN), a metropolitan area network (MAN), a public network, a mobile access network, a mesh network, a fiber-optics network (e.g., passive optical networks (PONS)), or a combination of networks. Service provider network 210 may include, for example, one or more private Internet Protocol (IP) networks that use a private IP address space. Although shown as a single element in FIG. 2, service provider network 210 may include a number of separate networks. Service provider network 210 may permit mobile devices 110 to download applications (e.g., AR application 205) and transfer data (e.g., target images, target image data, object definitions, etc.) to support augmented reality services.

According to an implementation, service provider network 210 may include a mobile access network 220 that transfers/receives information (e.g., voice, data, broadband applications, etc.) to/from a circuit-switched and/or packet-switched network. As an example, mobile access network 220 may include an LTE network, a Code Division Multiple Access (CDMA) network, a Wi-Fi network (e.g., using IEEE 802.11 standards), or another access network (e.g., an E-UTRAN, an enhanced high-rate packet data (eHRPD) network, or another 3G, 4G, or future wireless networks).

Server device 215 (also referred to as "server 215") may include a network or computing device. Server device 215 may provide backend processing to support functions of AR application 205, such as feature recognition, feature tracking, placement of virtual objects and presentation of virtual objects. For example, server device 215 may receive a target image captured from a camera on mobile device 110-1, along with mobile device data (e.g., a geo-location, a direction heading, and a tilt indication) collected contemporaneously with the target image. Server device 215 may identify features of the target image and/or generate a simplified model of the target image using, for example, edge detection techniques. As described further herein, server 215 may support, enhance, or replace functions of AR application on mobile device 110. For example, server 215 may receive sensor data and a continuing video feed from a camera of mobile device 110, may compare images from the continuing video feed, and may identify common features in the images. Server 215 may detect a location change based on the sensor data and changes in the common features between the images.

Server device 215 may also receive, from mobile device 110-2, a video feed when mobile device 110-2 is in the same position as mobile device 110-1 was when the target image was created. Server device 215 may detect a match between an image from the video feed and the simplified model, and may instruct mobile device 110-2 to present the virtual object when the match is detected.

Locator system 230 may include a satellite global positioning system (GPS), a cellular tower triangulation system, a WLAN access point locating system, a global navigation satellite system (GNSS), or another system that determines real-time (or near real-time) location information for subscribing devices, such as mobile device 110. In one implementation, locator system 230 may include a satellite to broadcast information to mobile device 110. In another implementation locator system 230 may include one or more other systems (e.g., a location information server) to gather/ provide information about the position, direction, and/or destination of mobile device 110.

In FIG. 2, the particular arrangement and number of components of network environment 200 are illustrated for simplicity. In practice there may be more mobile devices 110, service provider networks 210, server devices 215, access networks 220, and locator systems 230. For example, there may be millions of mobile devices 110.

Figure 3B:
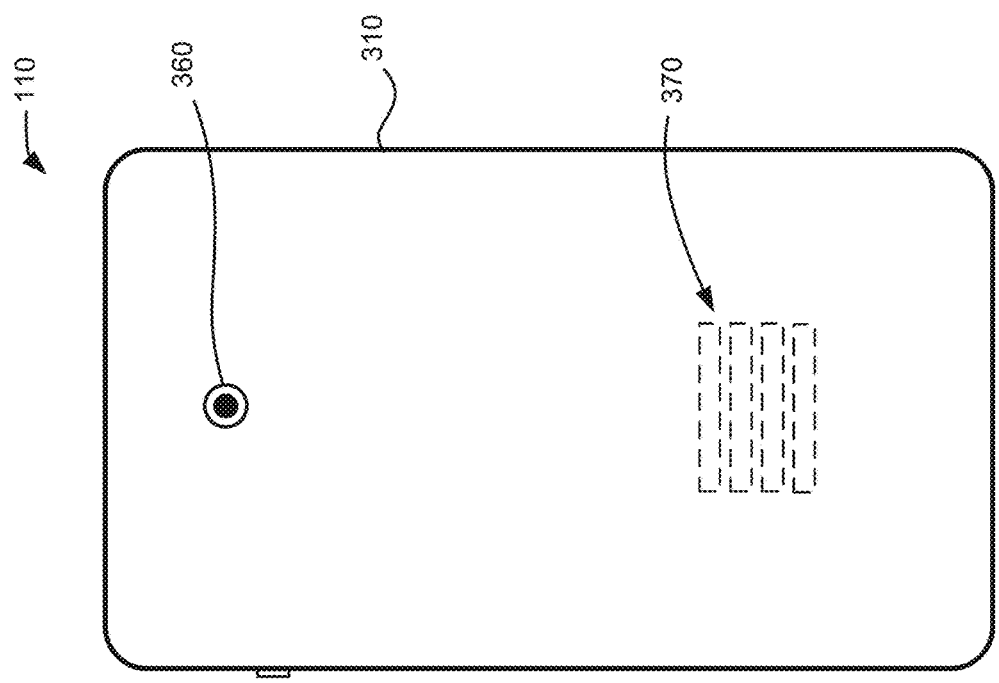
FIGS. 3A and 3B are diagrams of front and rear views, respectively, of the mobile device of FIG. 2, according to an implementation described herein.
Figure 3A:
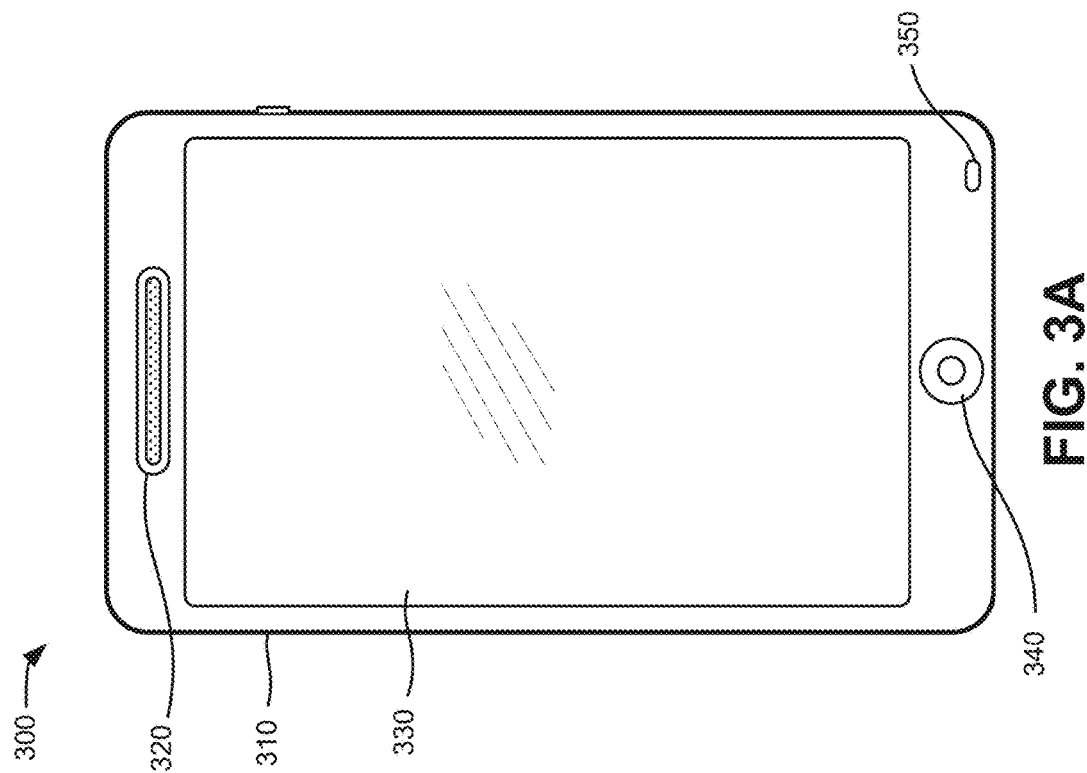

FIGS. 3A and 3B show an exemplary communications device 300 that may correspond to mobile device 110. FIGS. 3A and 3B include a front view and back view, respectively, of communications device 300. As shown in FIGS. 3A and 3B, communications device 300 may include a housing 310, a speaker 320, a display screen 330, control button(s) 340, a microphone 350, camera element 360, and/or sensors 370.

Housing 310 may include a chassis via which some or all of the components of communications device 300 are mechanically secured and/or covered. Speaker 320 may include a component to receive input signals from communications device 300 and transmit audio output signals, which communicate audible information to a user of communications device 300.

Display screen 330 may include a component to receive input signals and present a visual output in the form of text, images, videos and/or combinations of text, images, and/or videos. In one implementation, display screen 330 may selectively present a reality image (e.g., image 120), an augmented reality image (e.g., image 120 with virtual object 130) and/or present a user interface to create a virtual object. In one implementation, display screen 330 may correspond to a touch screen that includes a component to detect an input. For example, display screen 330 may include a pressure sensor to detect touch for inputting content to touch screen 330. Alternatively or additionally, display screen 330 may include a capacitive or field sensor to detect a touch or proximity of the user or an input device to display screen 330.

Control buttons 340 may include one or more buttons that accept or otherwise detect an input from the user (e.g., the user presses a control button or combinations of control buttons) and send electrical signals to a processor (not shown) that may cause communications device 300 to perform one or more operations. For example, control buttons 340 may be used to cause communications device 300 to perform operations related to closing an application or switching between applications being executed on communications device 300. Microphone 350 may include a component to receive audible information from a user and send, as output, a signal transmitted to another user device, or cause the device to perform one or more operations.

Camera element 360 may include a component to receive, as input, optical signals and send, as output, a digital image or video that can be, for example, viewed on display screen 330, stored in the memory of communications device 300, discarded and/or transmitted to another communications device 300. Camera element 360 may include a rear-facing lens on a back side of communications device 300 (i.e., facing an opposite direction to display screen 330) and, optionally, another camera lens may be provided on a front side of communications device 300. In one implementation, camera element 360 may capture image data, and communication device 300 may identify its location based on the captured image data.

Sensors 370 may include any types of sensors used to provide information to mobile device 110 (e.g., contemporaneously with collection of images by camera element 360). Sensors 370 may include, for example, rotation sensors (e.g., a gyroscope that detects roll, pitch, and yaw), motion sensors (e.g., an accelerometer), a compass, and/or magnetic field sensors (e.g., a magnetometer). Data from sensors 370 may be associated with a new target image or used to help identify an existing target image. For example, data from sensors 370 may be collected when a user selects a target image or inserts a virtual object. Additionally, data from sensors 370 may be applied to help identify when a newly-captured image matches a target image and to help project how perspectives of features in images may change.

Figure 4:
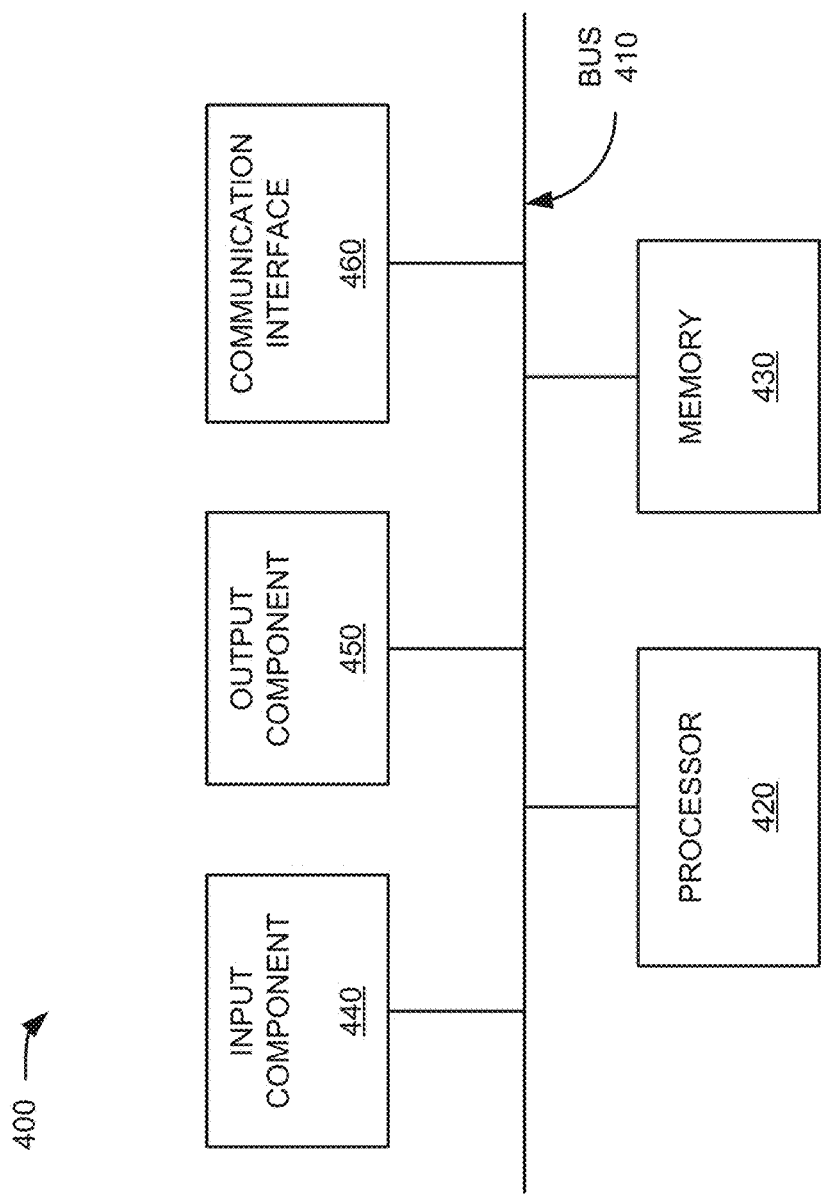
FIG. 4 shows a diagram of exemplary components that may be included in a device included in the network environment shown in FIG. 2.

FIG. 4 is a diagram illustrating exemplary components of a device 400. Device 400 may correspond, for example, to a component of mobile device 110, server device 215, or another device in network environment 200. Alternatively or additionally, mobile device 110, server device 215, or the other devices in network environment 200 may include one or more devices 400 and/or one or more components of device 400.

Device 400 may include a bus 410, a processor 420, a memory 430, an input component 440, an output component 450, and a communication interface 460. Bus 410 may include a path that permits communication among the components of device 400. Processor 420 may include a processor, a microprocessor, or processing logic that may interpret and execute instructions. Memory 430 may include any type of dynamic storage device that may store information and instructions, for execution by processor 420, and/or any type of non-volatile storage device that may store information for use by processor 420. Input component 440 may include a mechanism that permits a user to input information to device 400, such as a keyboard, a keypad, a button, a switch, etc. Output component 450 may include a mechanism that outputs information to the user, such as a display, a speaker, one or more light emitting diodes (LEDs), etc.

Communication interface 460 may include a transceiver that enables device 400 to communicate with other devices and/or systems via wireless communications, wired communications, or a combination of wireless and wired communications. For example, communication interface 460 may include mechanisms for communicating with another device or system via a network. Communication interface 460 may include an antenna assembly for transmission and/or reception of RF signals. For example, communication interface 460 may include one or more antennas to transmit and/or receive RF signals over the air. Communication interface 460 may, for example, receive RF signals and transmit them over the air to mobile device 110/access network 220, and receive RF signals over the air from access network 220/mobile device 110. In one implementation, for example, communication interface 460 may communicate with a network and/or devices connected to a network. Alternatively or additionally, communication interface 460 may be a logical component that includes input and output ports, input and output systems, and/or other input and output components that facilitate the transmission of data to other devices.

Device 400 may perform certain operations in response to processor 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer components, additional components, different components, or differently arranged components than those depicted in FIG. 4. For example, device 400 may include one or more switch fabrics instead of, or in addition to, bus 410. Additionally, or alternatively, one or more components of device 400 may perform one or more tasks described as being performed by one or more other components of device 400.

Figure 5:
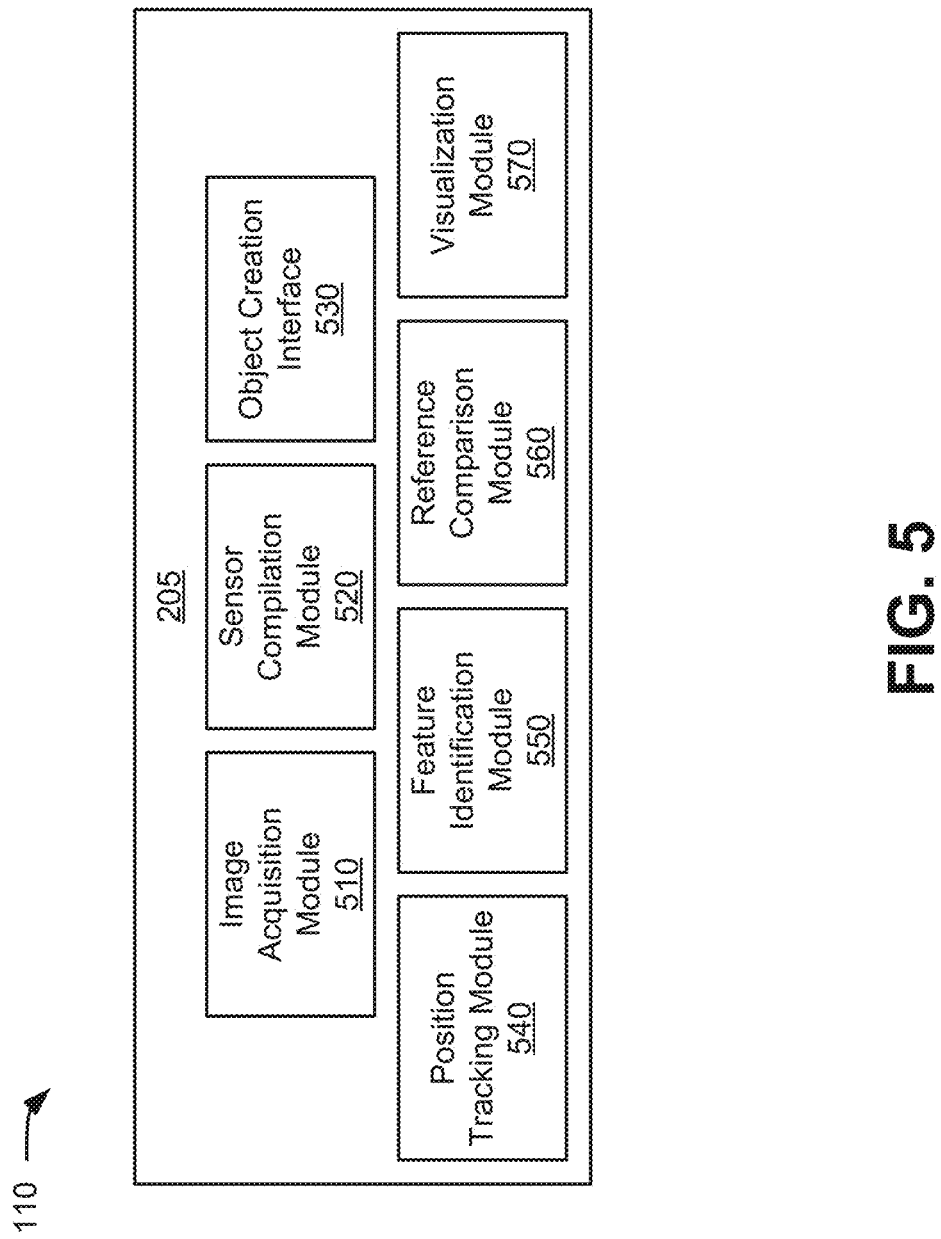
FIG. 5 is a block diagram illustrating exemplary functional components of the mobile device of FIG. 1.
Figure 6A:
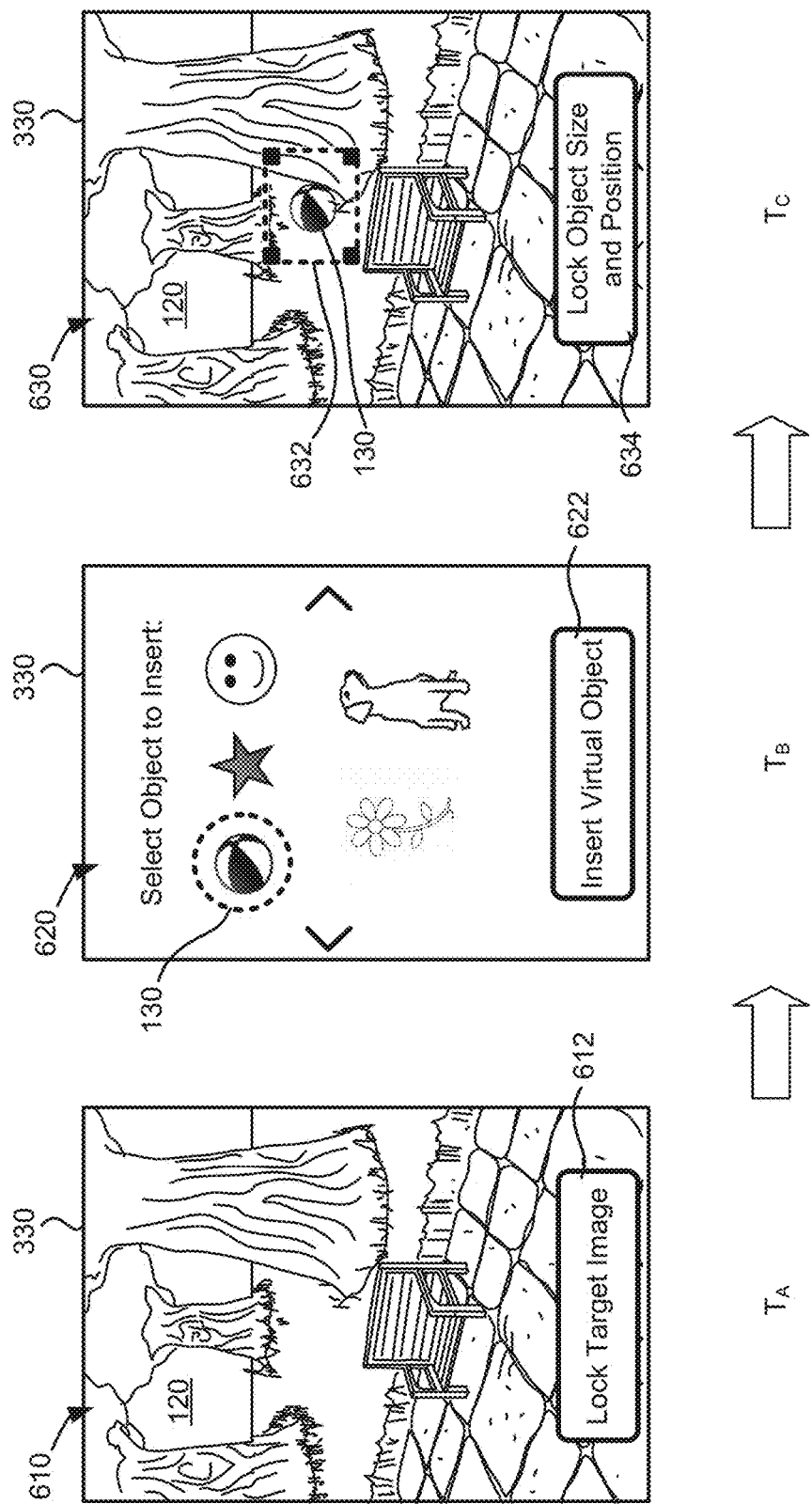
FIGS. 6A and 6B are diagrams illustrating placement of a virtual object within an augmented reality space.

FIG. 5 is a block diagram illustrating exemplary functional components of mobile device 110. As shown in FIG. 5, mobile device 110 may include AR application 205 with an image acquisition module 510, a sensor compilation module 520, an object creation interface 530, a position tracking module 540, a feature identification module 550, a reference comparison module 560, and a visualization module 570. FIG. 6A is an illustration of display screen 330 when mobile device 110 is implementing certain features of AR application 205. Aspects of image acquisition module 510, sensor compilation module 520, object creation interface 530, position tracking module 540, feature identification module 550, reference comparison module 560, and visualization module 570 are described in conjunction with FIG. 6A.

Image acquisition module 510 may collect images (e.g., frames of a video feed) from camera element 360 and present the images to a user via display screen 330. For example, as shown in FIG. 6A, a user may activate AR application 205 to acquire images via camera element 360. Mobile device 110 may present a continuous feed of images from camera element 360 on an image selection screen 610 with a lock target image button 612 (or another selection mechanism) to accept a user's selection. At a time $T_A$, when the user identifies a particular camera view that is desired for establishing a reference point for a virtual space, the user may select lock target image button 612 to acquire the current view as target image 120. Target image 120 will be used as a point of reference for an AR space, including unlocking the AR space to place virtual objects and unlocking the AR space for subsequent discovery of virtual objects. According to implementations described herein, zoom functionality of camera element 360 is disabled when AR application 205 is in use.

In another implementation, image acquisition module 510 may collect reference images that may be used by mobile device 110 or server 215 to compare with a target image (e.g., target image 120). Reference images may be collected, for example, by a camera element 360 of a different mobile device 110 (mobile device 110-2) than the mobile device 110 (e.g., mobile device 110-1) that provided a corresponding target image. For example, image acquisition module 510 may receive images to be used for comparison with target image 120 (e.g., to unlock an AR space associated with target image 120). Image acquisition module 510 may also collect images to be used for comparison with previous reference images from the same mobile device 110 (e.g., to compare features and detect movement within an AR space after the AR space is unlocked via a match with the target image).

Sensor compilation module 520 may collect data about mobile device 110 contemporaneously to the acquisition of target image 120 and contemporaneously to the placement of virtual objects. For example, when the user selects lock target image button 612, sensor compilation module 520 may obtain data from sensors 370, location information from locator system 230, and/or other data. In one implementation, sensor compilation module 520 may collect a geographic location, a direction heading, and tilt angles (e.g., roll, pitch, and yaw) of mobile device 110 at the time target image 120 is selected (e.g., time $T_A$ of FIG. 6A). In another implementation, sensor compilation module 520 may collect accelerometer data and/or other sensor data contemporaneously with video feeds for reference images (e.g., at time $T_2$ of FIG. 1).

Object creation interface 530 may allow a user to insert a virtual object into an AR space. In one implementation, object creation interface 530 may provide a user interface screen 620 to select a virtual object from a catalog of virtual objects. For example, as shown in FIG. 6A at time $T_B$, AR application 205 may present screen 620 with a group of virtual objects available for insertion into an AR space and an insert virtual object button 622 (or another selection mechanism). In one implementation, each virtual object may include (or be linked to) three-dimensional information to permit two-dimensional rendering of the virtual object from different orientations and perspectives (e.g., front, back, side, etc., of the virtual object). In another implementation, virtual objects available for selection may include peer-generated virtual objects which may be uploaded to a catalog of virtual objects using, for example, an application programming interfaces (API). The catalog of virtual objects may be provided to AR application 205, for example, from server 215. The user may select a particular virtual object (e.g., virtual object 130) from screen 620 and select the insert virtual object button 622 to add virtual object 130 into the AR space associated with the reference position.

Upon selection of insert virtual object button 622 at time $T_B$, object creation interface 530 may present a placement screen 630 with virtual object 130 within (or overlaid on) a video feed from the rear-facing camera (e.g., camera element 360) of mobile device 110. As shown in FIG. 6A at time $T_C$, placement screen 630 may present virtual object 130 with an editing box 632 to accept user input. In one implementation, a user may position virtual object 130/editing box 632 within placement screen 630 to overlay virtual object 130 on target image 120. In another implementation, virtual object 130/editing box 632 may be placed in the center of placement screen 630 and the user may move mobile device 110 to align virtual object 130/editing box 632 within the images of the video image. In one implementation, editing box 632 may include "handles" to allow a user to indicate a change in size, a rotation, or a change in three-dimensional perspective of virtual object 130. Once a user has positioned virtual object 130 with the desired size, position, and orientation, the user may select a lock object size and position button 634 to complete user input for insertion of virtual object 130. Sensor data from sensors 370 may be collected contemporaneously with the user's selection of lock object size and position button 634 to complete an object definition for virtual object 130. The virtual object definition may essentially allow virtual object to be attached to a portion of the AR sphere relative to the reference position of the AR sphere.

Figure 6B:
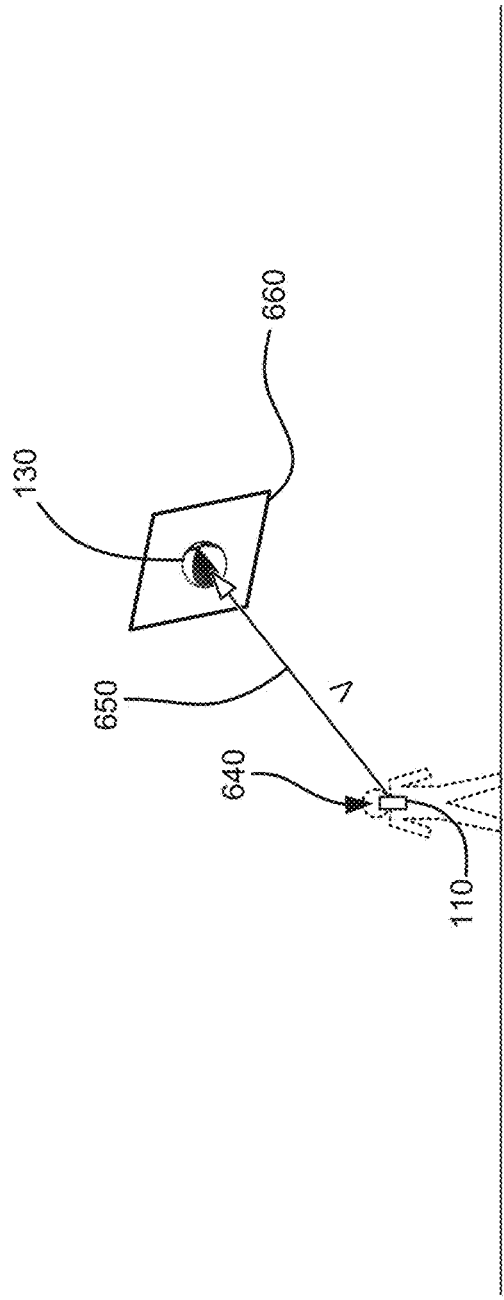

Based on the target image data for target image 120, object creation interface 530 may establish a reference position for an augmented reality space. The reference position may correspond to the geo-location, directional heading, and tilt of mobile device 110 for viewing target image 120. FIG. 6B provides an illustration of an implementation of a reference position. As shown in FIG. 6B, object creation interface 530 may define a vector 650, extending from reference position 640 to an endpoint at a virtual location of virtual object 130. Vector 650 may include one or more default values to associate a distance (e.g., depth of field) for the placement of virtual object 130. For example, vector 650 may be assigned a default length (or magnitude) from which a vector direction may be determined based on the user's placement of virtual object 130 in placement screen 630. Vector 650 is a mathematical construct for use by AR application 205/server 215 and may not be seen by a user of mobile device 110.

According to one aspect, virtual object 130 may be constructed as a two-dimensional rendering on a plane 660 that is orthogonal to vector 650. For example, as shown in FIG. 6B, virtual object 130 may be a two-dimensional rendering within plane 660 at the end of vector 650. Plane 660 may be orthogonal to vector 650. As described above with respect to virtual object 130, a user of mobile device 110 may position virtual object 130 as a two-dimensional rendering with the desired size, screen position, and orientation within plane 660. The size, screen position, and orientation of virtual object 130 provide a basis for accurately rendering virtual object 130 when mobile device 110 is moved to a different location.

Position tracking module 540 may apply information from sensor compilation module 520, reference comparison module 560, server 215, and/or locator system 230. For example, position tracking module 540 may track mobile device 110 from an initial position (e.g., when capturing an image to unlock an AR space) to a subsequent position relative to the initial position. In one implementation, position tracking module 540 may use information from locator system 230 and or sensors 370 to verify camera movement data calculated by reference comparison module 560.

In another implementation, position tracking module 540 may assemble the target image 120, the corresponding sensor data from sensor compilation module 520, and the object definitions from object creation interface 530 into a data package. In one implementation, position tracking module 540 may provide a data package for each virtual object placed by a user of mobile device 110. For example, position tracking module 540 may provide a data package to server 215 for rendering of virtual object 130 within the selected plane (e.g., plane 660). As described further herein, at a later time, position tracking module 540 may provide another data package to server 215 for rendering of virtual object 130 within a different plane. In another implementation, position tracking module 540 may provide the target image 120, the corresponding sensor data from sensor compilation module 520, and the virtual object placement data from object creation interface 530 to server 215 separately (e.g., in real time as they are collected).

Feature identification module 550 may identify features of target image 120, another image associated with the placement of virtual object 130, and/or subsequent images (e.g., from image acquisition module 510). In one implementation, feature identification module 550 may detect one or more features in target image 120 when target image 120 is selected as part of a process to place virtual object 130. For example, feature identification module 550 may attempt to match patterns/objects in image 120 against a library of known features (e.g., accessed from service provider network 210). In some instances, the library of known features may include predicted stationary objects (e.g., chairs, tables, windows, benches, bookshelves, signs, tree trunks, etc.), predicted movable objects (e.g., body parts, leaves, clouds, etc.), and questionable objects that may be either moving or stationary objects (e.g., cars, trucks, bicycles, etc.). In another implementation, features within target image 120 may be detected by server 215 and provided to mobile device 110 along with target image 120 and target image data. Feature identification module 550 may incorporate one or more known object recognition technologies.

Feature identification module 550 may detect features such as stationary objects, moveable objects, and/or questionable objects in target image 120. Stationary objects detected within target image 120 may be marked for future comparison. Movable objects detected within target image 120 may be ignored or treated as occlusions (e.g., interrupting continuity of another feature) within target image 120. Questionable objects detected within target image 120 may be marked as requiring additional verification. Feature identification module 550 may also detect features in reference images using similar techniques. In another implementation, feature identification module 550 may use a simplified edge model (e.g., received from image simplification module 830) to detect features.

Reference comparison module 560 may compare features of images over time to detect movement of mobile device 110. More particularly, reference comparison module 560 may compare stationary objects (e.g., features) between successive reference images. For example, reference comparison module 560 may compare stationary objects from a video feed received from image acquisition module 510 and track the relative position changes of the features (e.g., particular edges, points, etc.). In one implementation, reference comparison module 560 may also compare questionable objects between successive reference images. For example, if there are insufficient stationary objects to provide a comparison, reference comparison module 560 may compare questionable objects from a video feed and compare results against other data (e.g., other sensor data) to determine if the questionable objects may be stationary. For any stationary objects (or for questionable objects that are determined to be stationary), reference comparison module 560 may translate relative movements detected by the reference image comparison into corresponding movements of mobile device 110 (or, more particularly, the rear-facing lens of camera element 360). In one implementation, reference comparison module 560 may provide the corresponding camera movement data to position tracking module 540 or position monitor 740 for use with other sensor data. Reference comparison module 560 may use the same features or different features than used by, for example, target comparison module 850 described below.

Visualization module 570 may receive rendering information from server 215 and present virtual objects. When one of mobile devices 110-1 or 110-2 is identified at the reference position (e.g., reference position 640 of FIG. 6B) the AR space including virtual object 130 may be unlocked. Visualization module 570 may receive rendering information for virtual object 130 and present virtual object 130 on mobile device 110-1 or 110-2 when the orientation of mobile device 110 corresponds to the object definition for the virtual object. For example, visualization module 570 may receive a match indication from server 215 that a combination of image, location data, and sensor data for mobile device 110-2 corresponds to both a reference position and a target image (a "virtual object trigger") created by mobile device 110-1. Visualization module 570 may then present virtual object 130 on mobile device 110-2 when mobile device 110-2 is aligned according to the object definition for virtual object 130 (which may or may not correspond to the reference position for AR sphere 650). When movement of mobile device 110 is detected, visualization module 570 may receive updated rendering information for virtual object 130 to reflect, for example, a change in perspective/depth perception and visualization module 570 may present virtual object 130 on mobile device 110. In another implementation, when movement of mobile device 110 is detected, visualization module 570 may apply changes to the presentation of virtual object 130 based on vector calculations and the original rendering information previously received from server 215.

Although FIG. 5 shows exemplary components of mobile device 110, in other implementations, mobile device 110 may contain fewer components, additional components, or different components than those depicted in FIG. 5. For example, in one implementation, one version of AR application 205 may include components for virtual object presentation only, and another version of AR application 205 may include components for both placement and presentation of virtual objects. Additionally, or alternatively, one or more functions of mobile device 110 may be performed by (or in conjunction with) server device 215.

Figure 7:
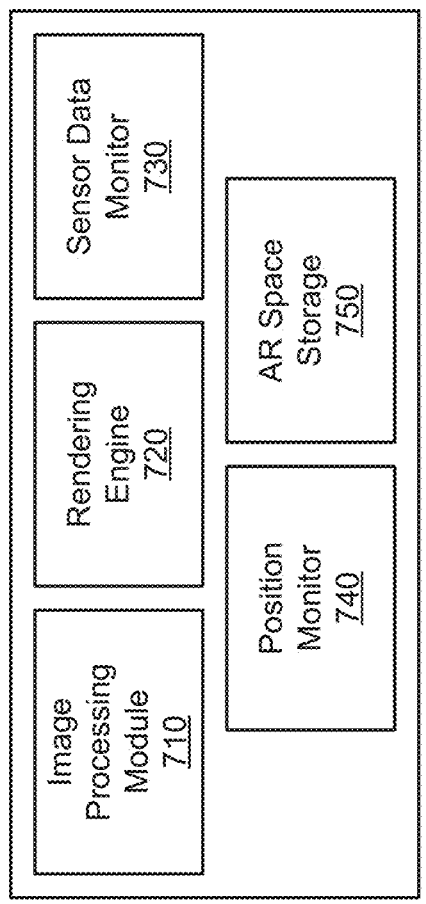
FIG. 7 is a block diagram illustrating exemplary functional components of the server device of FIG. 2.

FIG. 7 is a block diagram illustrating exemplary functional components of server device 215. As shown in FIG. 7, server device 215 may include an image processing module 710, a rendering engine 720, a sensor data monitor 730, a position monitor 740, and an AR space storage 750.

Figure 8:
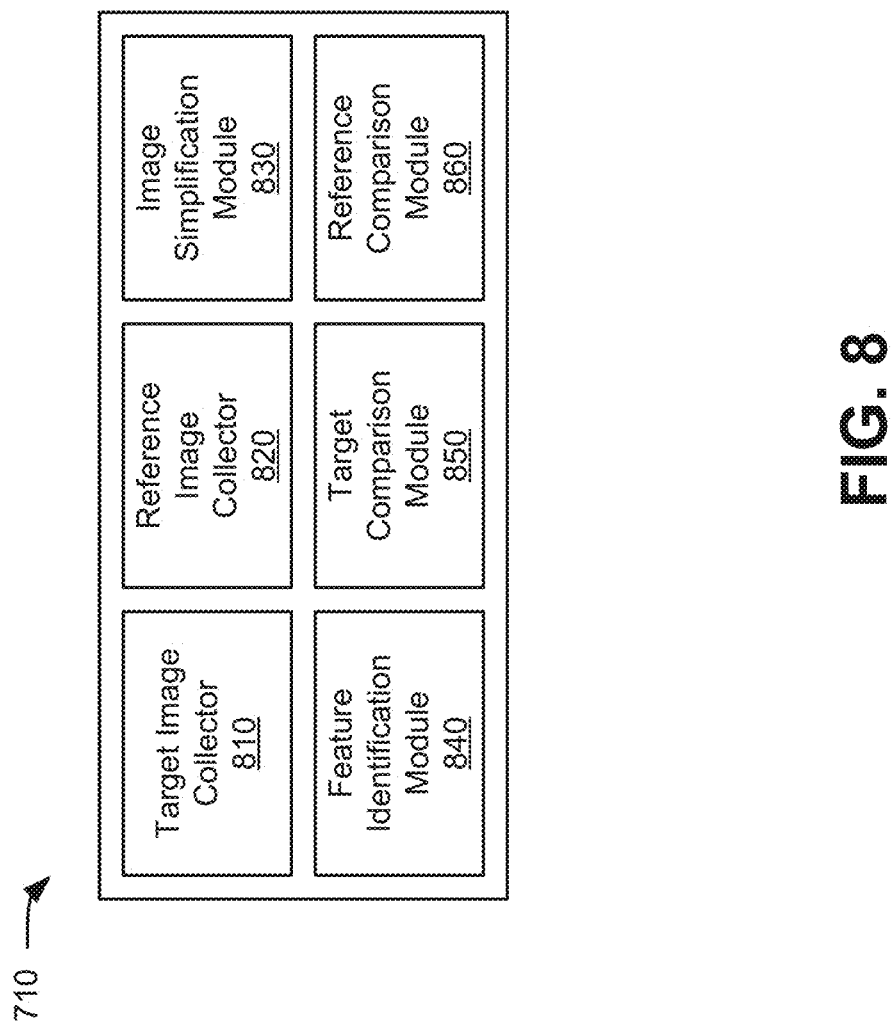
FIG. 8 is a block diagram illustrating exemplary functional components of the image processing module of FIG. 7.

Image processing module 710 may generally receive images from mobile device 110 (e.g., from image acquisition module 510 and/or position tracking module 540) to help determine a reference position for mobile device 110 for rendering a virtual object with an augmented reality space. Image processing module 710 may also compare images to identify a change in reference position for subsequent presentation of virtual objects. Additional details of image processing module 710 are described in connection with FIG. 8. As shown in FIG. 8, image processing module 710 may include a target image collector 810, a reference image collector 820, an image simplification module 830, a feature identification module 840, a target comparison module 850, and a reference comparison module 860. Aspects of target image collector 810, reference image collector 820, image simplification module 830, feature identification module 840, target comparison module 850, and reference comparison module 860 are described in conjunction with FIGS. 9A-9C.

Target image collector 810 may receive and store a target image and target image data from mobile device 110. The target image may provide a point of reference from which a particular AR space may be unlocked and a virtual object (e.g., virtual object 130) may be placed relative to the reference position. Target image collector 810 may receive, for example, target image 120 and corresponding target image data from mobile device 110 when a user elects to create an AR space. Target image collector 810 may also receive corresponding image and image data from mobile device 110 when a user places virtual object 130 (e.g., in another location within the AR space) via object creation interface 530. Target image data may include sensor data obtained by sensors 370 of mobile device 110 contemporaneously with the acquisition of target image 120 or placement of virtual object 130. Target image data may also include geo-location data obtained, for example, by mobile device 110 from locator system 230.

Reference image collector 820 may receive and store reference images and reference image data from mobile device 110. Reference images maybe received, for example, from a different mobile device 110 (mobile device 110-2) than the mobile device 110 that provided a corresponding target image 120. For example, reference image collector 820 may receive images to be used for comparison with target image 120 (e.g., to unlock an AR space associated with target image 120). Reference image collector 820 may also receive images to be used for comparison with other reference images from the same mobile device (e.g., to compare features and detect movement within an unlocked AR space).

Image simplification module 830 may identify key elements of target image 120 to simplify matching with subsequent images (e.g., from the same mobile device 110 or another mobile device 110). For example, image simplification module 830 may identify all or a limited number of edges in target image 120. Edge detection may be performed using edge detection software, such as the Edge Detection and Image Segmentation (EDISON) System. In one implementation, the number of edges used by image simplification module 830 may be based on, for example, a statistically significant number of edges likely to represent a unique image for a given location (e.g., reference position 640, as indicated by particular geo-location coordinates, direction heading, and/or tilt). In another implementation, a set of "best" edges may be used based on length, continuity, connectivity, and/or clarity of the edges in target image 120. For example, image simplification module 830 may extract only straight edges for use in image matching, such that each of the edges may be presented in an angle-distance format.

Feature identification module 840 may perform functions to support, enhance, or replace functions of feature identification module 550 on mobile device 110. Feature identification module 840 may identify features of target image 120 (e.g., from target image collector 810) and subsequent images (e.g., from reference image collector 820). In one implementation, feature identification module 840 may detect one or more features in target image 120 when target image 120 is provided (e.g., via image acquisition module 510) as part of a process to place virtual object 130. For example, feature identification module 840 may attempt to match patterns/objects in image 120 and subsequent reference images against a library of known features in a manner similar to that described above. In another implementation, feature identification module 840 may use a simplified edge model from image simplification module 830 to detect features.

Target comparison module 850 may receive reference images (e.g., video image sequences) from mobile device 110 (e.g., image acquisition module 510), along with geographic location and sensor data for mobile device 110. When target comparison module 850 identifies that mobile device 110 is in the same geographic location and in a similar orientation to what is indicated in previously-stored target image data, target comparison module 850 may apply the simplified edge model extracted from target image 120 to an incoming sequence of reference images. In one implementation, target comparison module 850 may perform edge detection of the incoming reference images for comparison with the simplified edge model. In another implementation, a different matching technique may be used to identify a match between an incoming reference image and target image 120, such as object recognition and feature matching. Target comparison module 850 may provide a signal to unlock an AR space when a match is identified. The signal may indicate, for example, that the mobile device 110 is in a reference position and that rendering engine 720 may provide instructions for AR application 205 to present a virtual object (e.g., virtual object 130).

Reference comparison module 860 may perform functions to support, enhance, or replace functions of reference comparison module 560 on mobile device 110. Reference comparison module 860 may compare features of images over time to detect movement of mobile device 110. More particularly, reference comparison module 860 may compare stationary objects between successive reference images. For example, reference comparison module 860 may compare stationary objects from a video feed received from mobile device 110 (e.g., image acquisition module 510) and track the relative movements of the features (e.g., particular edges, points, etc.). In one implementation, reference comparison module 860 may provide the corresponding camera movement data to position monitor 740 for use with other sensor data. Reference comparison module 860 may use the same features or different features than those used by target comparison module 850.

Referring back to FIG. 7, rendering engine 720 may receive a signal (e.g., from image processing module 710) to render a virtual object for presentation on mobile device 110. In one implementation, rendering engine 720 may provide instructions for presenting virtual object 130 on mobile device 110 when mobile device 110 is in reference position 640. The size, screen position, and orientation of virtual object 130 when mobile device 110 is in the reference position may correspond to the size, position, and orientation of virtual object 130 as originally provided to server 215 via object creation interface 530 (although virtual object 130 would only be visible when mobile device 110 is in the reference position if the object definition for virtual object 130 corresponds closely to the reference position). For example, similar to that previously described in relation to FIG. 6B, when an image match is detected, rendering engine 720 may provide instructions for presenting virtual object 130 on mobile device 110 based on a reference plane (e.g., plane 660) orthogonal to vector 650.

After mobile device 110 is identified in a reference position (e.g., reference position 640) and an image match is detected (i.e., enabling an AR space to be unlocked and, in some cases, initial presentation of virtual object 130), rendering engine 720 may receive additional position data from mobile device 110. The additional position data may include sensor data (e.g., received at sensor data monitor 730) and/or camera movement data (e.g., from reference comparison module 860) that indicates movement of mobile device 110 to an updated position. Rendering engine 720 may apply the sensor data and camera movement data to initiate appropriate rendering of virtual object 130 at a different perspective within the AR space for the target image. As described below in connection with FIG. 10, rendering engine 720 may define a new vector, extending from the updated position to the virtual location of virtual object 130. Virtual object 130 may be constructed as a two-dimensional rendering on a new plane that is orthogonal to the new vector.

Sensor data monitor 730 may receive sensor data from mobile device 110 (e.g., sensor compilation module 520 or position tracking module 540). In some implementations, sensor data monitor 730 may receive different types of data from mobile device 110. For example, sensor data monitor 730 may receive location data only or no data when mobile device 110 is not at a geo-location corresponding to a reference position for an AR space. When mobile device 110 is at a geo-location corresponding to a reference position for an AR space, sensor data monitor 730 may receive real-time location, direction, tilt, and/or rotation data of mobile device 110. Sensor data monitor 730 may compare data from mobile device 110 with stored reference positions and secondary orientations to detect when mobile device 110 is within an AR space and when mobile device 110 is oriented to view a previously-defined virtual object. When sensor data monitor 730 identifies a match of mobile device 110 orientation and a stored position, sensor data monitor 730 may inform rendering engine 720.

Position monitor 740 may perform functions to support position tracking module 540. In another implementation, position monitor 740 may perform some or all of the functions of position tracking module 540 and communicate information to AR application 205 on mobile device 110.

AR space storage 750 may store AR space definitions (e.g., associated with each reference location 640/target image 120). Each AR space definition may include, for example, a target image 120, corresponding target image data, and virtual object definitions with virtual object placement data relative to the target image data. In one implementation, AR space definitions may also include corresponding simplified edge models. AR space definitions may also include a user list (or access requirements) of other users permitted to access a particular AR space. For example, AR space storage 750 may store AR space definitions from multiple users and store access instructions (e.g., private, public, etc.) for each AR space definition. In one implementation, at least some data fields from AR space storage 750 may be linked to an AR space catalog or listing that may be accessible by users of AR application 205.

Although FIG. 7 shows exemplary components of server 215, in other implementations, server 215 may contain fewer components, additional components, or different components than those depicted in FIG. 7. For example, while the functional components of FIG. 7 are shown in connection with server device 215, in some implementations one or more functions described herein may be performed by another device, such a mobile device 110 or another device within service provider network 210.

Figure 9B:
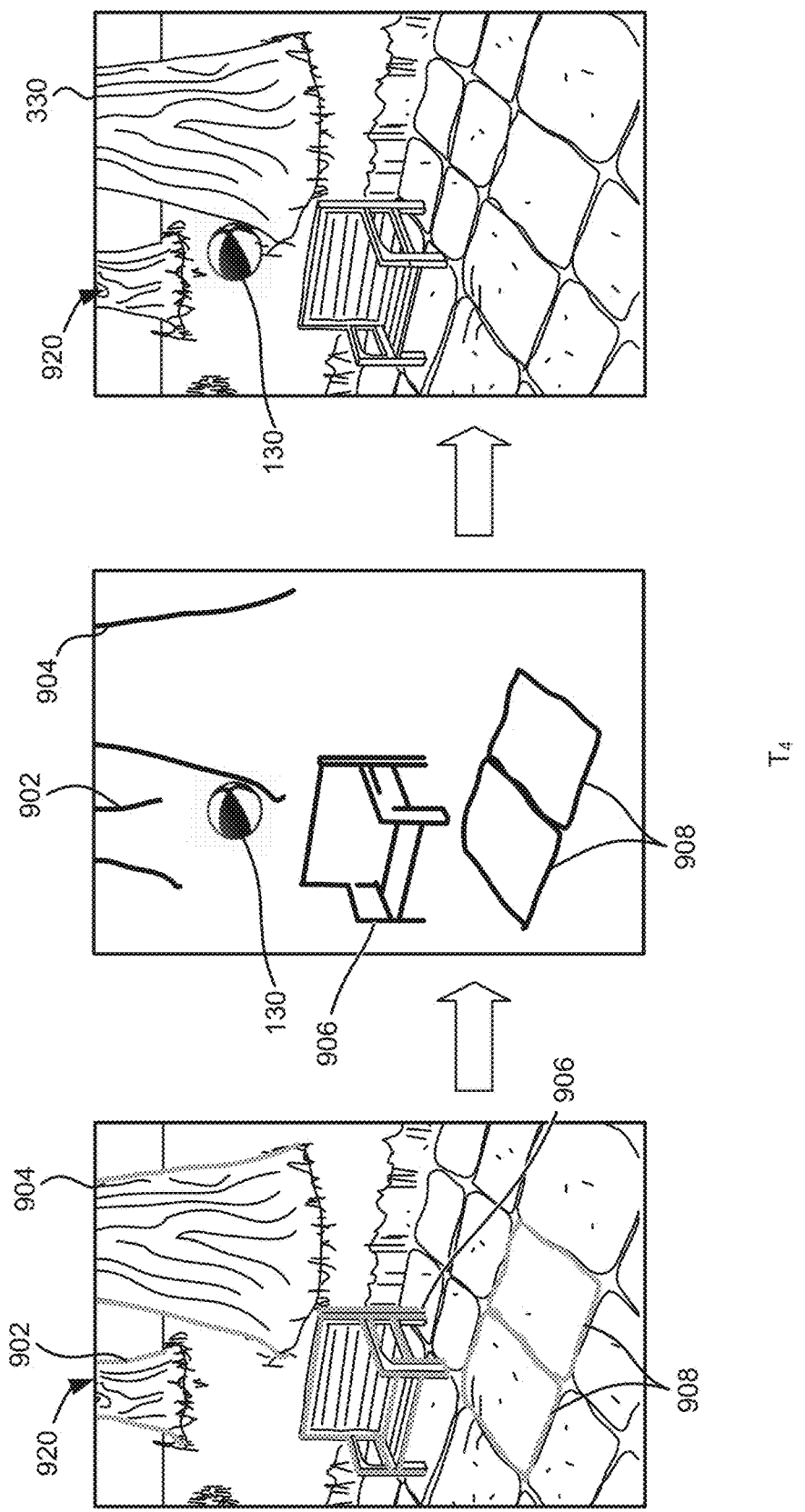
Figure 9C:
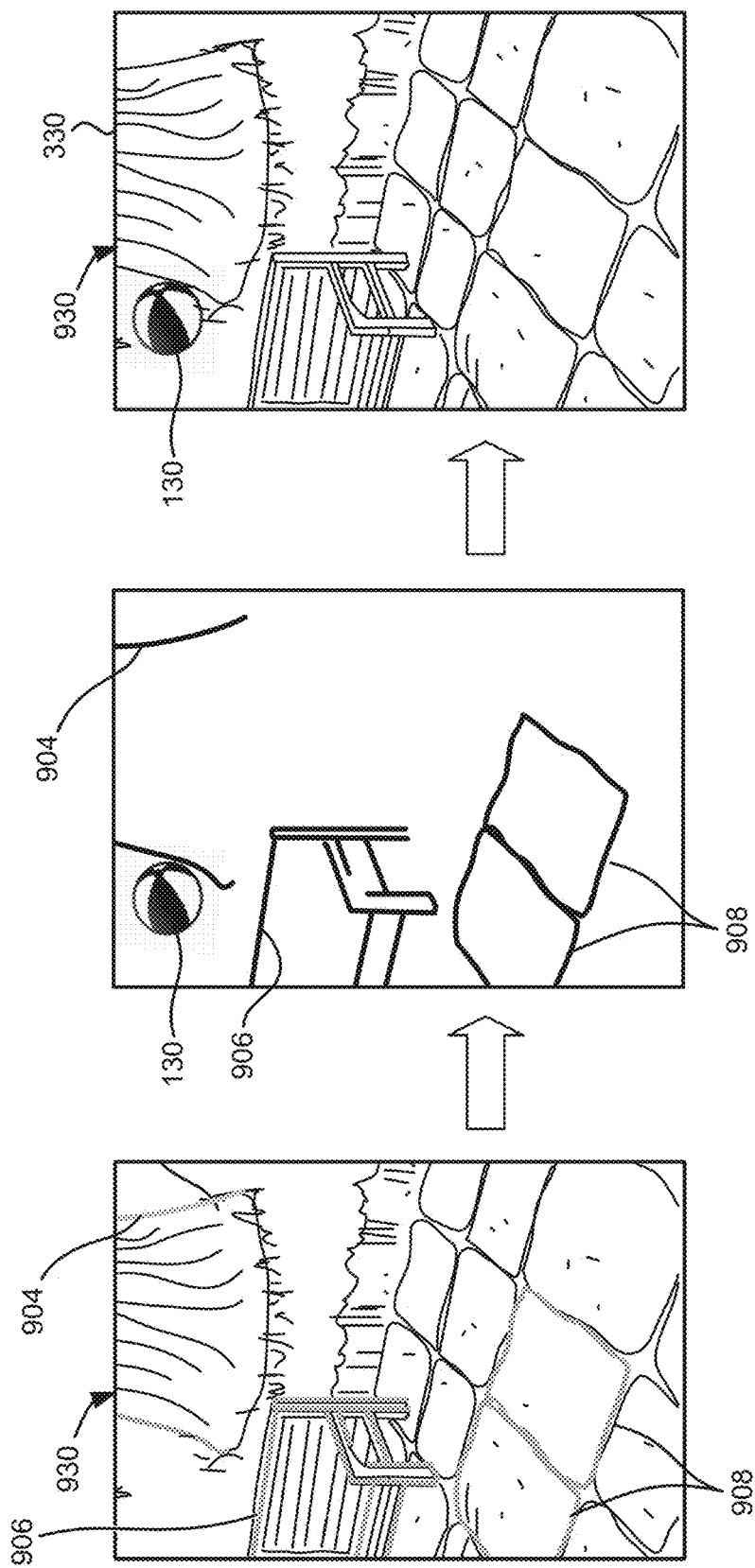

FIGS. 9A-9C provides an illustration of tracking features and adding features to a feature set according to an implementation described herein. In other implementations, different feature recognition techniques may be used. Techniques described in FIGS. 9A-9C may be performed by AR application 205 on mobile device 110 alone or in combination with server 215. As shown in FIG. 9A, at a time $T_3$, feature identification module 550/840 may identify one or more features 902, 904, 906 within a reference image 910 captured on mobile device 110. Reference image 910 may match, for example, a target image (e.g., target image 120) for a previously-created AR space or another image corresponding to a location where a virtual object as been placed. Features 902, 904, and 906 may be recognized as stationary objects that can be used for position tracking of mobile device 110. Based on previously-provided target image data and the object definition for virtual object 130, server 215 may provide instructions for an initial rendering of virtual objet 130 on display 330 of mobile device 110. As described, for example, in connection with FIG. 6B, virtual object 130 may be rendered in a two-dimensional plane with respect to a vector 650 that extends from reference position 640.

Referring to FIG. 9B, at a time $T_4$, mobile device 110 may be moved away from reference position 640, and another reference image 920 from mobile device 110 may be captured. Reference comparison module 560/860 may identify one or more of features 902, 904, and 906 within reference image 920. Reference comparison module 560/860 may determine a relative change in features 902, 904, and 906 of reference image 920 relative to the same features of reference image 910. The relative change in features 902, 904, and 906 may be identified as corresponding movements of mobile device 110. For example, server 215 may interpret the relative change in features (e.g., along with accelerometer data or other sensor 370 data) as mobile device 110 moving closer to feature 906. Thus, server 215 (e.g., position monitor 740) may identify an updated reference position for mobile device 110, as described further below in connection with FIG. 10.

Figure 10:
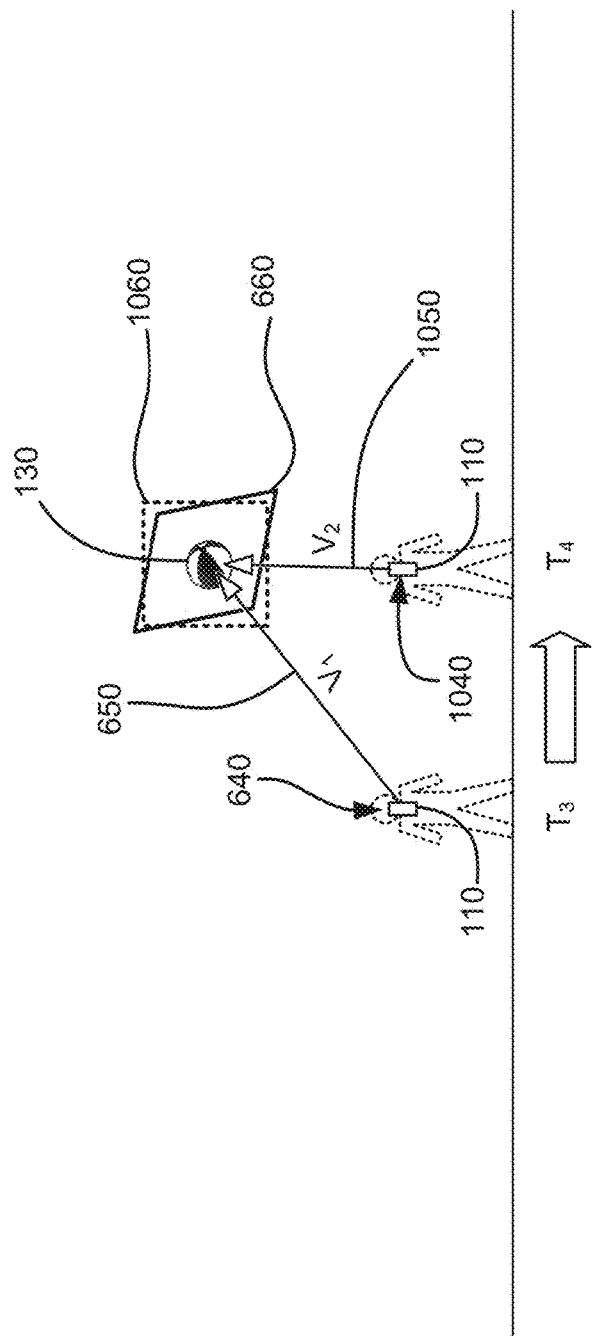
FIG. 10 is a diagram that illustrates changing a reference position for a virtual object, according to an implementation described herein.

FIG. 10 provides an illustration of changing a reference position, according to an implementation. As shown in FIG. 10, at time $T_3$, vector 650 has a defined endpoint at virtual object 130, and virtual object 130 is rendered within two-dimensional plane 660 that is orthogonal to vector 650. At time $T_4$, position tracking module 540, for example, may identify an updated reference position 1040 for mobile device 110 using the relative change in features 902, 904, and 906 (e.g., along with accelerometer data or other sensor 370 data). Based on the updated reference position 1040, visualization module 570 may define a new vector 1050, extending from the updated reference position 1040 to the endpoint of vector 650 (e.g., at the virtual location of virtual object 130). Thus, at time $T_4$, visualization module 570 may provide instructions to present virtual object 130 within a two-dimensional plane 1060 that is orthogonal to new vector 1050.

Referring again to FIG. 9B, feature identification module 550/840 may identify one or more new features 908 within reference image 920. In one implementation, feature identification module 550/840 may continually look for new features in reference images. In another implementation, feature identification module 550/840 may look for new features in reference images when previously-detected features become occluded or trend toward moving out of the camera view. For example, in comparing image 910 and 920, reference comparison module 560/860 may detect feature 902 and 906 approaching a top and side boundary of image 920. In response, reference comparison module 560/860 may instruct feature identification module 550/840 to identify additional features. New features 908 may be used to supplement comparison of subsequent images.

Referring to FIG. 9C, at a time $T_5$, mobile device 110 may be moved away from updated reference position 1040, and another reference image 930 may be captured by mobile device 110. Reference comparison module 560/860 may identify one or more of features 904, 906, and 908 within reference image 930 (e.g., feature 902 no longer being visible within image 930). Reference comparison module 560/860 may determine a relative change in features 904, 906, and 908 of reference image 930 relative to the same features of reference image 920. The relative change in features 904, 906, and 908 may be identified as corresponding movements of mobile device 110. For example, position tracking module 540 may interpret the relative change in features (e.g., along with accelerometer data or other sensor 370 data) as mobile device 110 moving even closer to feature 906. Thus, position tracking module 540 may identify another updated reference position for mobile device 110 and visualization module 570 or rendering engine 720 may define a new vector (not shown), similar to the description above. Using the new vector, visualization module 570/rendering engine 720 may provide instructions to present virtual object 130 within a new two-dimensional plane that is orthogonal to the new vector at time $T_5$.

Although shown as a visual representation in FIGS. 9A-9C for illustration, in some implementations, mobile device 110 and/or server 215 may perform feature matching and vector calculations without presenting any visual representations.

Figure 11:
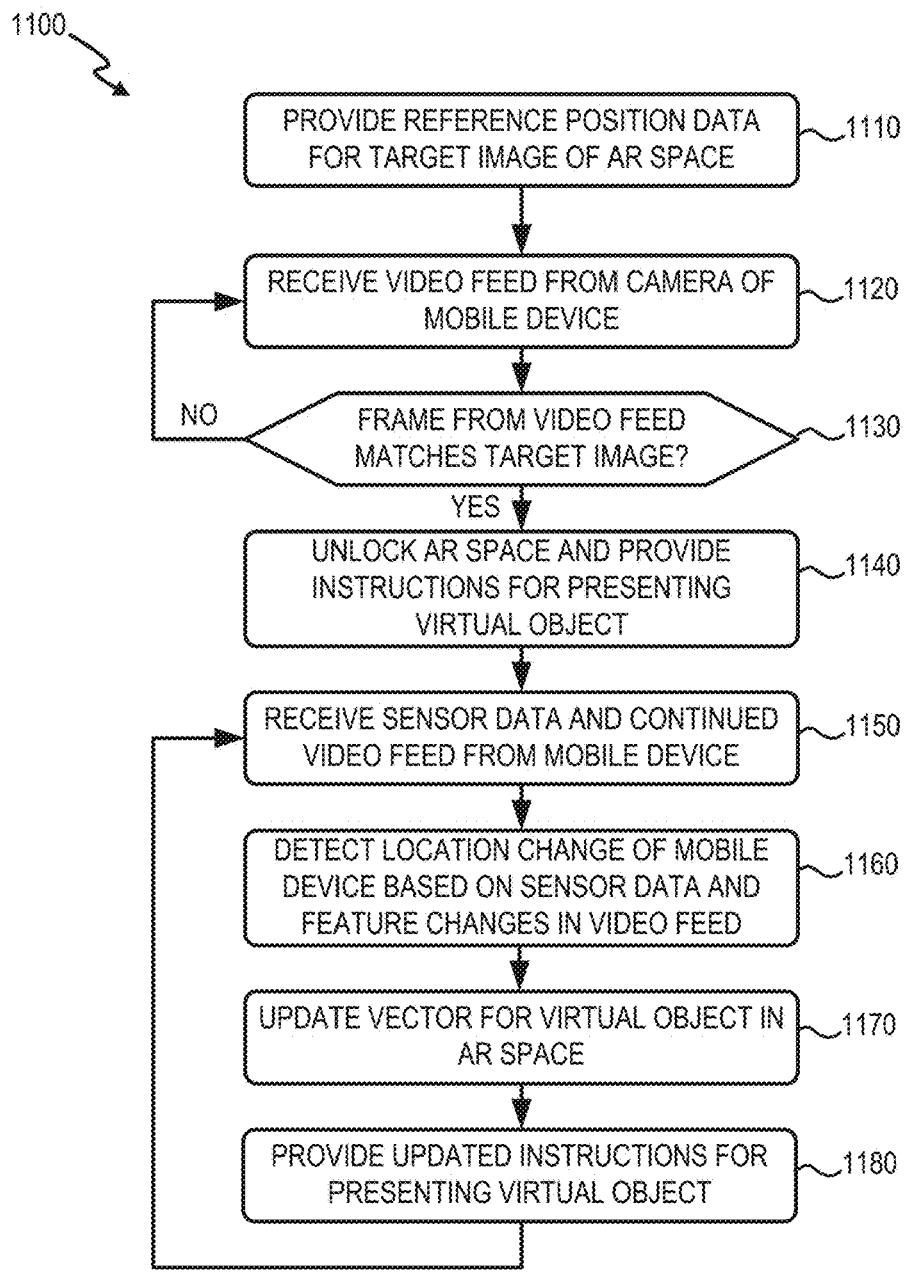
FIG. 11 is a flow diagram that illustrates an exemplary process for detecting movement within an augmented reality space, according to an implementation described herein.

FIG. 11 is a flow diagram illustrating an exemplary process 1100 for detecting movement within an augmented reality space. In one implementation, process 1100 may be implemented by server 215. In another implementation, process 1100 may be implemented by server 215 in conjunction with one or more other devices in network environment 200, such as mobile devices 110. In still other implementations, process 1100 may be implemented by mobile device 110.

Process 1100 may include providing reference position data for a target image of an augmented reality space (block 1110). For example, server 215 may receive a request from AR application 205 (on mobile device 110) for coordinates of an initial reference position (e.g., reference position 640) of a previously-generated AR space. In one implementation, AR application 205 may request information for an AR space previously stored with AR space storage 750. Server 215 may provide coordinates (e.g., particular geo-location coordinates, direction heading, and/or tilt from target image data) of reference position 640 to AR application 205 for storage on mobile device 110. In another implementation, server 215 may publish coordinates of AR spaces in a listing that may be accessible to AR application 205.

Process 1100 may also include receiving a video feed from a camera of a mobile device (block 1120), and determining if a frame from the video feed matches the target image (block 1130). For example, once application 205 detects that mobile device 110 is in reference position 640, image acquisition module 510 may begin to feed video images (e.g., reference images) to, for example, server 215. Server 215 (e.g., target comparison module 850) may receive the video images to apply a simplified edge model, feature matching, or other comparison technique to determine a match with the target image.

If a frame from the video feed does not match the target image (block 1130—NO), then process 1100 may return to block 1120 to continuing receiving a video feed from the mobile device. When a frame from the video feed matches the target image (block 1130—YES), process 1100 may include unlocking the augmented reality space and providing display instructions for a virtual object (block 1140). For example, target comparison module 850 may provide a signal to unlock an AR space when a match is identified. The signal may indicate, for example, that the mobile device 110 is in a reference position and that rendering engine 720 may provide instructions for AR application 205 to present a virtual object (e.g., virtual object 130). In one implementation, the virtual object (e.g., virtual object 130) may be visible when mobile device 110 is oriented in a position corresponding to target image data for target image 120. In another implementation, the virtual object may be associated with another orientation of mobile device 110 and, thus, not visible until mobile device 110 is oriented in a position corresponding to the virtual object definition.

Process 1100 may further include receiving sensor data and a continuing video feed from the mobile device (block 1150). For example, image processing module 710 may receive images from mobile device 110 and compare images to identify a change in reference position for subsequent presentation of virtual object 130. Also, sensor data monitor 730 may receive real-time location, direction, tilt, and/or rotation data of mobile device 110. In another implementation, AR application 205 may process features locally on mobile device 110.

Process 1100 may additionally include detecting a location change of the mobile device based on the sensor data and feature changes in the video feed (block 1160). For example, as shown in connection with FIG. 9B, mobile device 110 may be moved away from reference position 640, and another reference image 920 may be captured by mobile device 110. Feature identification module 550/840 may identify one or more of features 902, 904, and 906 within reference image 920 and may determine a relative change in features 902, 904, and 906 in reference image 920 relative to the same features of reference image 910. The relative change may be identified as corresponding movements of mobile device 110. For example, feature identification module 550/840 may interpret the relative change in features (e.g., along with accelerometer data or other sensor 370 data) as mobile device 110 moving closer to feature 906.

Process 1100 may also include updating a vector for the virtual object in the augmented reality space (block 1170), and providing updated instructions for presenting a perspective of the virtual object (block 1180). For example, as shown in FIG. 10 at time $T_4$, position tracking module 540 or position monitor 740 may identify an updated reference position 1040 for mobile device 110 using the relative change in features 902, 904, and 906 (e.g., along with accelerometer data or other sensor 370 data). Based on the updated reference position 1040, visualization module 570 or rendering engine 720 may define a new vector 1050, extending from the updated reference position 1040 to the endpoint of vector 650 (e.g., at the virtual location of virtual object 130). In another implementation, the new vector may be defined for the virtual object even when the virtual object would not be visible in the current video feed of mobile device 110. Visualization module 570 or rendering engine 720 may provide instructions for presenting virtual object 130 on mobile device 110 based on the updated plane (e.g., plane 1060) orthogonal to vector 1050. Thus, mobile device 110 (e.g., visualization module 570) would, for example, present virtual object 130 as a two-dimensional rendering within plane 1060 at the end of vector 1050.

Systems described herein allow for feature tracking in an AR space using a single rear-facing camera of a mobile device. A mobile device may store a target image and target image data collected contemporaneously with the target image. The mobile device may receive a reference position indication that corresponds to the target image data and receives a video feed from a camera while the mobile device is in the reference position. The mobile device may detect a match between a first image from the video feed and the target image, may unlock an augmented reality space, and may instruct presentation of a virtual object onto the video feed. The mobile device may receive sensor data and a continuing video feed from the camera, may compare a second image from the continuing video feed with the first image, and may identify common features in the first and second images. The mobile device may detect a location change based on the sensor data and changes in the common features between the first and second images.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 11, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for unlocking an augmented reality space, the method comprising:
   receiving reference position data for a target image of the augmented reality space, the reference position data corresponding to target image data acquired at a reference position, the target image data including a geo-location, a direction heading, and a tilt;
   receiving a video feed from a camera;
   detecting a match between a first image from the video feed and the target image of the augmented reality space;
   unlocking, in response to detecting the match, the augmented reality space and receiving a virtual object definition that includes an object type, a size, and a vector for a virtual object, the vector including a default magnitude extending from the reference position to a location of the virtual object;
   instructing presentation of a perspective of the virtual object in a plane orthogonal to the vector;

receiving sensor data for a mobile device after the unlocking;

comparing a second image, which is a subsequent image of the video feed relative to the first image, with the first image;

identifying common features in the first image and the second image based on the comparing;

detecting a location change of the mobile device based on the sensor data and changes in the common features between the first image and the second image, wherein the location change reflects an updated reference position;

calculating, based on the updated reference position, an updated vector from the updated reference position to the location of the virtual object, for presentation of the virtual object in the augmented reality space; and instructing presentation of an updated perspective of the virtual object, corresponding to the updated reference position, based on the updated vector.

2. The method of claim 1, wherein instructing presentation of the updated perspective of the virtual object further comprises:

instructing presentation of the updated perspective of the virtual object in a plane orthogonal to the updated vector.

3. The method of claim 1, wherein the virtual object definition further includes an orientation of the virtual object.

4. The method of claim 1, wherein the virtual object is a two-dimensional representation of a three-dimensional object.

5. The method of claim 1, wherein identifying common features in the first image and the second image further comprises:

identifying, within the first image, a stationary object; and
identifying, within the second image, the stationary object at a different perspective.

6. The method of claim 5, wherein the stationary object is identified based on comparisons with a library of stationary objects.

7. The method of claim 6, wherein detecting the location change of the mobile device further comprises:

determining a relative change in the stationary object in the second image relative to the stationary object in the first image; and
translating the relative change to a corresponding change in position of the mobile device.

8. The method of claim 7, wherein detecting the location change of the mobile device further comprises:

identifying an accelerometer reading of the mobile device at a time of capturing the second image; and
estimating a direction of movement to the corresponding change in position of the mobile device.

9. The method of claim 1, further comprising:

receiving an application that includes a user interface to enable the mobile device to obtain the target image and the target image data.

10. The method of claim 1, wherein the camera is included within the mobile device as a rear-facing camera facing a direction opposite to a display screen.

11. A mobile device comprising:

one or more memories to store instructions; and
one or more processors to execute the instructions to:
receive reference position data for a target image of the augmented reality space, the reference position data corresponding to target image data acquired at a reference position, the target image data including a geo-location, a direction heading, and a tilt;
receive a video feed from a camera;
detect a match between a first image from the video feed and the target image of the augmented reality space;
unlock, in response to detecting the match, the augmented reality space and receiving a virtual object definition that includes an object type, a size, and a vector for a virtual object, the vector including a default magnitude extending from the reference position to a location of the virtual object;
instruct presentation of a perspective of the virtual object in a plane orthogonal to the vector;
receive sensor data for a mobile device after the unlocking;
compare a second image, which is a subsequent image of the video feed relative to the first image, with the first image;
identify common features in the first image and the second image based on the comparing;
detect a location change of the mobile device based on the sensor data and changes in the common features between the first image and the second image,
calculate, based on the updated reference position, an updated vector from the updated reference position to the location of the virtual object, for presentation of the virtual object in the augmented reality space; and
instruct presentation of an updated perspective of the virtual object, corresponding to the updated reference position, based on the updated vector.

12. The mobile device of claim 11, wherein, when instructing presentation of the updated perspective of the virtual object, the one or more processors are further to execute the instructions to:

instruct presentation of the updated perspective of the virtual object in a plane orthogonal to the updated vector.

13. The mobile device of claim 11, wherein the virtual object definition further includes an orientation of the virtual object.

14. The mobile device of claim 11, wherein the virtual object is a two-dimensional representation of a three-dimensional object.

15. The mobile device of claim 11, wherein, when identifying common features in the first image and the second image, the one or more processors are further to execute the instructions to:

receive an indication of a stationary object detected in the target image;
identify, within the first image, the stationary object; and
identify, within the second image, the stationary object at a different perspective.

16. The mobile device of claim 15, wherein the stationary object is identified in the target image based on comparisons with a library of stationary objects.

17. The mobile device of claim 15, wherein the one or more processors are further to execute the instructions to:

identify, within the second image, another stationary object that was not identified in the target image; and
track, within subsequent images from the video feed, a relative position of the other stationary object.

18. A non-transitory computer-readable medium containing instructions executable by at least one processor, the computer-readable medium comprising one or more instructions to:

receive reference position data for a target image of the augmented reality space, the reference position data corresponding to target image data acquired at a reference position, the target image data including a geo-location, a direction heading, and a tilt;

receive a video feed from a camera;

detect a match between a first image from the video feed and the target image of the augmented reality space;

unlock, in response to detecting the match, the augmented reality space and receiving a virtual object definition that includes an object type, a size, and a vector for a virtual object, the vector including a default magnitude extending from the reference position to a location of the virtual object;

instruct presentation of a perspective of the virtual object in a plane orthogonal to the vector;

receive sensor data for a mobile device after the unlocking;

compare a second image, which is a subsequent image of the video feed relative to the first image, with the first image;

identify common features in the first image and the second image based on the comparing;

detect a location change of the mobile device based on the sensor data and changes in the common features between the first image and the second image, calculate, based on the updated reference position, an updated vector from the updated reference position to the location of the virtual object, for presentation of the virtual object in the augmented reality space; and instruct presentation of an updated perspective of the virtual object, corresponding to the updated reference position, based on the updated vector.

19. The non-transitory computer-readable medium claim 18, further comprising one or more instructions to:

receive an indication of a potentially-stationary object detected in the target image;

verify, based on the first image, that the potentially-stationary object is stationary; and identify, within the second image, the stationary object at a different perspective.

20. The non-transitory computer-readable medium claim 18, further comprising one or more instructions to:

identify, within the second image, another stationary object that was not identified in the target image; and track, within subsequent images from the video feed, a relative position of the other stationary object.

* * * * *